No. 723,412. PATENTED MAR. 24, 1903.
J. C. SHEARER & L. FRANK.
MEAT HOLDER.
APPLICATION FILED MAR. 14, 1902.
NO MODEL.
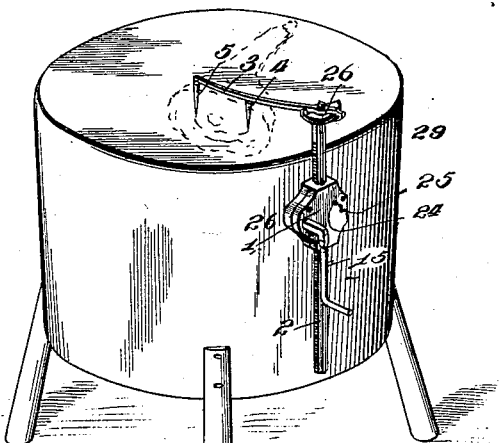
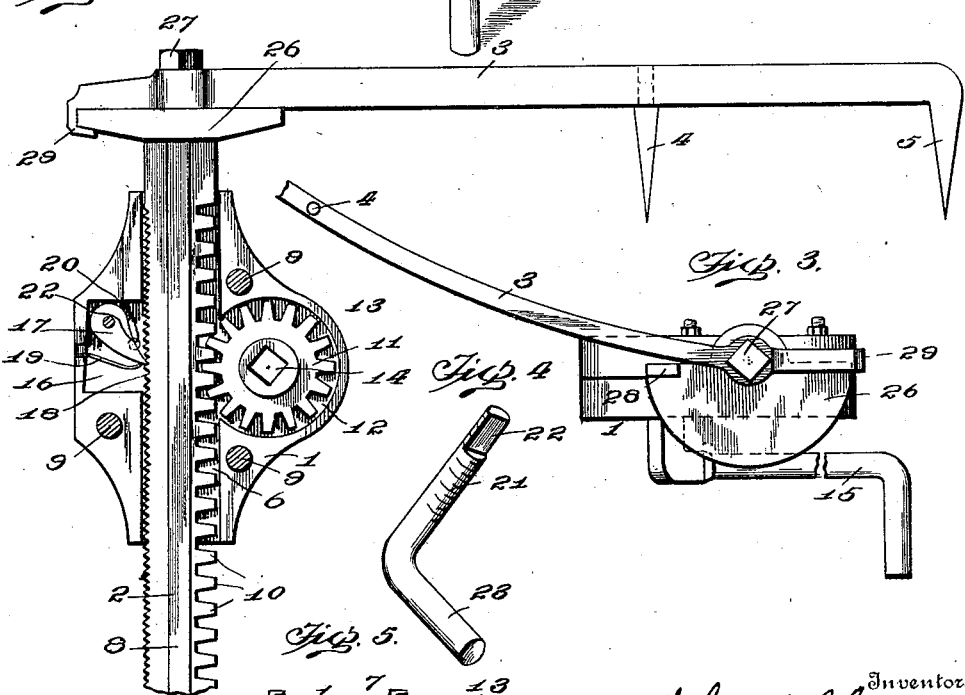
Witnesses
Inventors
John C. Shearer
and Lu Frank
By Mason Fenwick & Lawrence
Attorneys

UNITED STATES PATENT OFFICE.

JOHN C. SHEARER AND LEE FRANK, OF DAYTON, OHIO.

MEAT-HOLDER.

SPECIFICATION forming part of Letters Patent No. 723,412, dated March 24, 1903.

Application filed March 14, 1902. Serial No. 98,272. (No model.)

*To all whom it may concern:*

Be it known that we, JOHN C. SHEARER and LEE FRANK, citizens of the United States, residing at Dayton, in the county of Montgomery and State of Ohio, have invented certain new and useful Improvements in Meat-Holders; and we do hereby declare the following to be a full, clear, and exact description of the invention, such as will enable others skilled in the art to which it appertains to make and use the same.

Our invention relates to improvements in means for holding meats and other articles upon a block, counter, table, or other support when the said meats are to be carved, cut, or otherwise operated upon.

It consists in a reciprocating bar, an arm carried thereby for engaging the meat or other article, and means for raising and lowering the said bar and holding it in proper position, as may be required.

It further consists in certain other novel constructions, combinations, and arrangements of parts, as will be hereinafter fully described and claimed.

In the accompanying drawings, forming a part of this invention, Figure 1 represents a perspective view of the meat-holder applied to a chopping-block. Fig. 2 is an enlarged view of the said meat-holder, a portion of the same being shown in elevation and a part in section, the casing for holding the reciprocating bar or standard being laid open. Fig. 3 is a top plan view of the meat-holder. Fig. 4 is a perspective view of the means for holding the locking-pawl of the reciprocating standard out of engagement with said standard. Fig. 5 is a detail horizontal sectional view through the casing for holding the standard of the device.

The mechanism which we have invented for the purpose of holding meat is designed to be attached to a meat-chopping block or a counter, table, or other support, as the case may be, and consists of a casing 1, in which moves a rack-bar or standard 2. The standard carries at its upper end a horizontal bar 3, which is provided with pointed tines or spurs 4 and 5, which are adapted to engage the meat to be held when the arm 3 is lowered upon the same. The casing is formed with a central passage 6, extending vertically through the same, the said passage being provided with grooves 7, which are adapted to receive ribs 8, formed longitudinally of the standard 2 upon each side thereof. These ribs serve to guide the standard 2 in its movement through the said casing without permitting the rack-teeth and ratchet-teeth formed upon the said standard to cause excessive friction or difficulty in moving the said standard. The casing 1 is preferably cast in two parts, which may be applied together upon each side of the standard 2 and are held together by a series of bolts or wood-screws 9.

The vertically-moving standard or bar 2 is formed along one of its edges with a series of teeth 10, forming a rack, the teeth meshing with the teeth of a pinion 11, which is mounted in a socket 12, formed within the casing 1. The pinion 11 is formed with hubs 13 on each side, which engage circular bearings formed in the casing 1. The hub of the said pinion is centrally apertured, the aperture 14 being preferably square or rectangular in shape, so that it may be engaged by the squared end of a crank-handle 15 and be turned thereby. By turning the handle of the pinion 11 the rack-bar or standard 2 may raised or lowered in the casing for lifting the arm 3 to a suitable height to place beneath or remove a piece of meat from under the said arm. A second recess, as 16, is formed in the casing 1, preferably upon the opposite side of said standard 2 from the recess 12. In this recess is pivoted a pawl 17, the nose or point of which engages a series of ratchet-teeth 18, formed along the edge of the standard 2. This pawl 17 is preferably normally held against said ratchet-teeth by means of a spring 19, which is carried by the said casing 1 and bears upon the edge of the said pawl. Inserted in a bearing 20, formed in the casing in proper proximity to the pawl 17, is a shaft or rod 21, formed with a flat face or halved portion 22 at its inner end. The outer end of this shaft is turned at right angles to form an operating-handle 23. By turning the handle 23 the flat face of the inner end of said shaft may be presented to the pawl 17, so as to permit the said pawl to engage the ratchet-teeth 18. Upon turning the handle 23 part way around the cylindrical surface of the inner end 22 of said shaft 21 will be forced against the pawl 7 and the pawl thus lifted from its engagement with the ratchet-teeth 18 against the action of the spring 19. The pawl 17 is so disposed within the casing 1 that when in engagement with the ratchet-teeth 18 the standard 2 is prevented from rising in the casing. When it is necessary to lift the standard, the pawl 17 is raised out of engagement with the ratchet-teeth 18 by the operation of the shaft 21 just described. The movement of the handle 23 is limited by detents or studs 24 and 25, projecting from the surface of the casing 1.

The upper end of the standard 2 is formed with an enlarged semicircular table or head 26, upon the upper surface of which is pivoted the arm 3. A pivot screw-bolt 27 passes through a bearing formed in the said arm 3 and is screwed into a threaded recess formed in the upper end of the standard 2. The semicircular head 26 of said standard is provided with an upwardly-projecting stud 28 at a suitable point, which forms a stop for the movement of the arm 3. The arm 3 may be turned upon the upper surface of the table 26 around the pivot-bolt 27 and is braced in its movement and properly held in position by means of a finger 29, which is bent downwardly and around the outer edge of the said head 26. This finger merely engages loosely the edge of the head, so that it is free to slide around upon said edge when the arm 3 is moved on its pivotal point. The arm 3 can thus be made to extend in different radial positions with respect to the standard 2, and thus commands a suitable range of the surface of the meat-block or counter upon which it is mounted. The arm 3 may be made straight, as shown in Fig. 2, or may be curved slightly, as shown in Figs. 1 and 3. The straight arm is preferably used when operating upon certain kinds of meat, while the curved arm is more suitable for holding other kinds of meat. The curved arm is, however, more generally employed, since the majority of meat-blocks in use are cylindrical, and when the device is lowered out of the way the arm can be folded against the side of the meat-block, snugly fitting the same, and be thereby kept entirely out of the way.

In using the device the standard 2 is raised by turning the pinion 11 so as to bring the arm 3 sufficiently above the meat-block or counter to place a piece of meat beneath the same. The pinion 11 is then released either by removing the handle therefrom or by turning the handle backwardly, so that the standard 2 and the arm 3 will be permitted to lower and the tines 4 and 5 will become embedded in the meat for securely holding it in place. The pawl 17 will prevent the standard from rising again and from accidentally working loose under the operations performed upon the meat.

It will be apparent, of course, that the casing 1 may be secured by a bracket, clamp, or any other suitable means to the meat-block, counter, or other support. The casing 1 is, however, preferably held together about the standard and at the same time supported upon the block by means of screws which are passed through the apertures in said casing and screwed into the block. The casing is secured to the side of the block a sufficient distance below the upper surface thereof to permit of the arm and standard being lowered below said upper surface when the device is not in use. In this way no part of the device will project high enough to interfere with the use of the block.

The short shaft 21, which is used for holding the pawl 17 out of engagement with the ratchet-teeth 18, is preferably screw-threaded upon its periphery, the said threads engaging corresponding threads formed in the aperture 20 in the casing 1. After the shaft 21 has been screwed into position the lugs or detents 24 and 25 are put into position, so as to limit the movement of the said shaft. The shaft is thus prevented from becoming unscrewed and getting out of place.

The parts of the device are simple in structure and can be strongly made and will be found very effective for the purposes desired.

Having now described our invention, what we claim as new, and desire to secure by Letters Patent, is—

1. A meat-holder comprising a casing, a rack-bar forming a standard and movably mounted in said casing, a flat head or platform at the upper end of said rack-bar, an arm pivoted to said head or platform so as to be capable of adjustment to various radial positions with respect to the said rack-bar, and means engaging the rack-bar for raising and lowering it, substantially as described.

2. A meat-holder, comprising a casing, a non-revoluble vertically-moving standard carried thereby, an arm pivoted to the upper end of said standard in line with the axis thereof so as to be capable of adjustment to various radial positions with respect to the standard, and means for raising and lowering the standard within the casing, substantially as described.

3. A meat-holder, comprising a casing, a vertically-moving standard finding bearings therein, a broad head or table at the upper end of said standard, an arm pivoted on said table, or head, capable of a pivotal movement on said head for bringing it to various radial positions, and means for holding the standard in operative position, substantially as described.

4. A meat-holder, comprising a casing, a standard mounted therein, a broad semicircular head at the upper end of the said standard, an arm pivoted upon said head and extending radially therefrom, an edge-inclosing finger on the arm, overhanging the edge of the said head for bracing the arm, in its different radial positions, and sharp meat-engaging tines or points carried by the said arm for engaging the meat to be held, substantially as described.

5. A meat-holder, comprising a casing, a standard moving therein, the said standard being provided with ratchet-teeth along one edge, a pawl pivoted within the casing for engaging said teeth, a spring normally holding the pawl in engagement with said teeth, means for controlling the action of the pawl, comprising a pin, cut away on one of its sides, to form a flattened depression on the pin opposite said pawl, the flat side permitting the pawl to engage the ratchet-teeth, while the round periphery of the pin will lift the pawl therefrom, substantially as described.

6. A meat-holder, comprising a casing, a vertical standard moving through the same, means for locking the standard against upward movement, comprising a pawl engaging ratchet-teeth on said standard, a rocking rod or shaft arranged at one side of said pawl and having screw-threads for engaging a threaded bearing in the casing so that it may be screwed into position, limiting detents or lugs engaging the outer end of said rock-shaft to prevent the same from becoming unscrewed, the inner end of said shaft being halved and formed with a flat face and a semicylindrical face, the flat face permitting the pawl to engage the ratchet-teeth, while the semicylindrical face, when brought against the said pawl, lifts the same from engagement with the ratchet-teeth, and a handle for turning the said threaded shaft, substantially as described.

In testimony whereof we hereunto affix our signatures in presence of two witnesses.

JOHN C. SHEARER.
LEE FRANK.

Witnesses:
C. J. McKEE,
CHAS. F. WARE.